United States Patent [19]

Siorek et al.

[11] 3,894,778

[45] July 15, 1975

[54] CABLE-ACTUATED TRACK TENSIONER

[75] Inventors: Richard W. Siorek, Warren; Ted Kozowyk, Detroit, both of Mich.

[73] Assignee: The United States of America as represented by the Secretary of the Army, Washington, D.C.

[22] Filed: Jan. 25, 1974

[21] Appl. No.: 436,582

[52] U.S. Cl. .............................. 305/22; 180/9.52
[51] Int. Cl. ............................................ B62d 55/14
[58] Field of Search .......... 305/21, 22, 24, 27, 28; 180/9.5, 9.52

[56] References Cited
UNITED STATES PATENTS

| | | | |
|---|---|---|---|
| 1,330,119 | 2/1920 | Johnson | 305/27 |
| 2,427,162 | 9/1947 | Schilling | 305/22 |
| 2,728,611 | 12/1955 | Brauss | 305/22 |

*Primary Examiner*—Philip Goodman
*Assistant Examiner*—John A. Carroll
*Attorney, Agent, or Firm*—John E. McRae; Peter A. Taucher; Robert P. Gibson

[57] ABSTRACT

Disclosed is a tensioning means for the tracks of a rough terrain vehicle such as a military tank. The tensioning means includes one or more cables, or similar flexible elements, trained between one of the road wheels and a track tension adjustment wheel. Upward movement of the roadwheel relative to the hull tends to lessen the track tension; the cable is located to exert a reaction force to move the adjustment wheel in a direction tending to restore track tension. The invention relates particularly to the use of cables or belts, etc, as the force-transmitting connection between the road wheel and the track tension adjustment wheel.

4 Claims, 4 Drawing Figures

CABLE-ACTUATED TRACK TENSIONER

The invention described herein may be manufactured, used, and licensed by or for the Government for governmental purposes without payment to us of any royalty thereon.

BACKGROUND OF THE INVENTION

U.S. Pat. No. 2,427,162 issued on Sept. 9, 1947 to R. Schilling et al shows an endless track vehicle wherein track tension is maintained by means of a system of levers connected between one of the road wheels and the track tension-adjustment wheel. The present invention seeks to improve on the patented arrangement by substituting cable type force-transmitting mechanisms for the patentee's levers. The cables are believed advantageous for such reasons as lessened space requirements, lesser weight, coarser or wider manufacturing tolerances, greater ease of adjustment and, possibly, less maintenance.

THE DRAWINGS

FIG. 1 pictorially illustrates variations in track tension that can occur during operation of conventional tracked vehicles.

Figure 1:
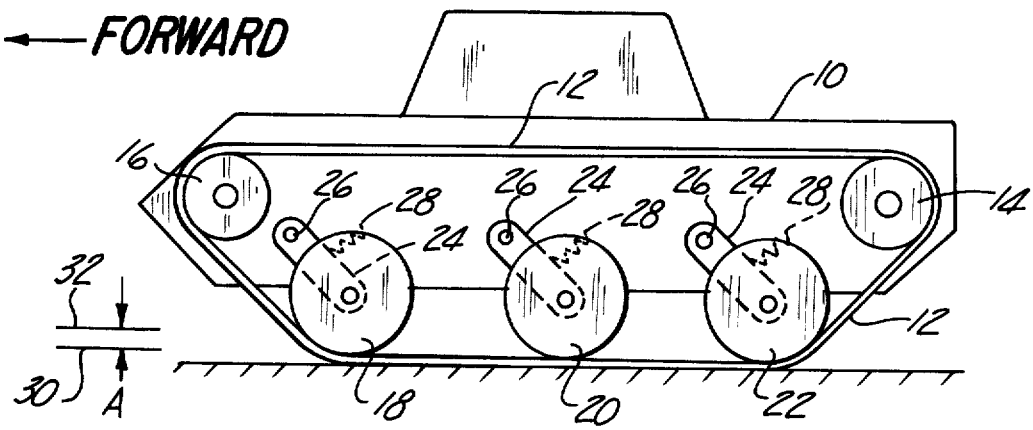

The vehicle shown in FIG. 1 comprises a hull 10 having an endless track 12 trained around a driver sprocket wheel 14, an idler wheel 16, and three lower road wheels 18, 20 and 22. Each of the lower road wheels is carried by a lever type road arm 24 pivotally attached to the hull by means of a shaft or axle 26. A spring or other yieldable suspension means 28 is trained between each road arm and the hull to yieldingly bear the hull weight while enabling the track to move over uneven terrain with minimum disturbance to the hull attitude.

During operation the road wheels have up and down movement relative to the hull, especially during braking, rapid acceleration, or travel over obstructions or depressions. In FIG. 1 the so-called "normal" position of the lower edges of the road wheels is denoted by numeral 30; the "up" position of the road wheel edges is denoted by numeral 32. When the road wheels are in their normal positions 30 the endless track 12 is sufficiently tensioned to maintain itself against disengagement from the wheels. When the road wheels are momentarily in the "up" position 32 the lower run of the track and the upper run of the track tend to move toward one another through a distance designated A, thereby permitting the possibility of immediate track disengagement or excessive shock on the connecting pins and links when the wheels are later restored to the normal position.

The present invention provides a cable type force-transmitting connection between one of the road wheels and the upper idler wheel, whereby relative upward movement of the road wheel causes the idler wheel to shift in a direction tending to restore or increase the track tension. The aim is to prevent undue slack in the endless track.

Figure 2:
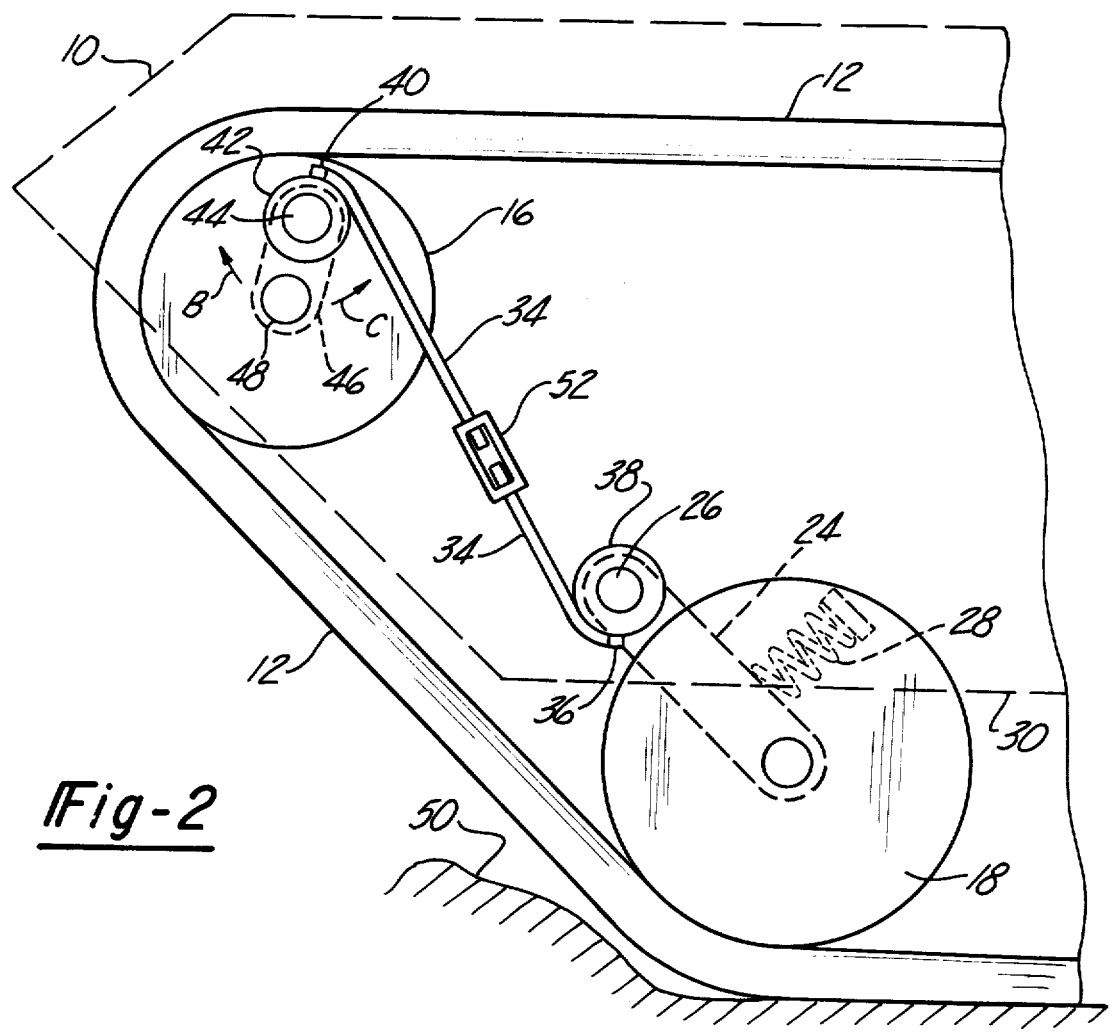
FIG. 2 illustrates in a semi-schematic fashion the present invention applied to an idler wheel located at the front end of a tracked vehicle.

As seen in FIG. 2, a cable 34 has one of its ends anchored at 36 on a drum or barrel 38 carried by the pivot shaft 26 for lever 24; the drum rotates with the shaft and lever. The other end of cable 34 is anchored at 40 on a drum or barrel 42 carried by the pivot shaft 44 of a lever 46. Shaft 44 extends within suitable bearings in the hull side wall so that lever 46 can pivot about the shaft axis as denoted by arrows B and C. At its lower end the lever carries a stub shaft 48 which constitutes an axle for idler wheel 16. Lever 46 functions as a suspension arm for wheel 16.

It will be seen that when wheel 16 is shifted forwardly in the arrow B direction the track tension tends to increase, and when wheel 16 is shifted rearwardly in the arrow C direction the track tension tends to decrease. The force for shifting wheel 16 is provided by the action of cable 34 in response to relative up-and-down movements of road wheel 18 and hull 10. As an example, assume that the vehicle track encounters an obstruction 50 (FIG. 2); the hull weight will cause road wheel 18 to move upwardly, thereby shifting lever 24 counterclockwise around the axis defined by pivot shaft 26. Cable 34 will wind onto barrel 38, thereby exerting a clockwise force on drum 42 and shaft 44. This action will shift lever arm 46 in the arrow B direction, thus increasing or maintaining track tension in spite of the track slack that would otherwise be generated by the upward displacement of wheel 18. As wheel 18 is restored downwardly toward its normal position (by the change in terrain) wheel 18 will exert a tensioning stress on the track. The track tension will force idler wheel 16 in the arrow C direction so that cable 34 will retain its original tautness. Initial cable tension adjustment may be accomplished with a turn buckle, shown schematically at 52 in FIG. 2, or other means.

Figure 3:
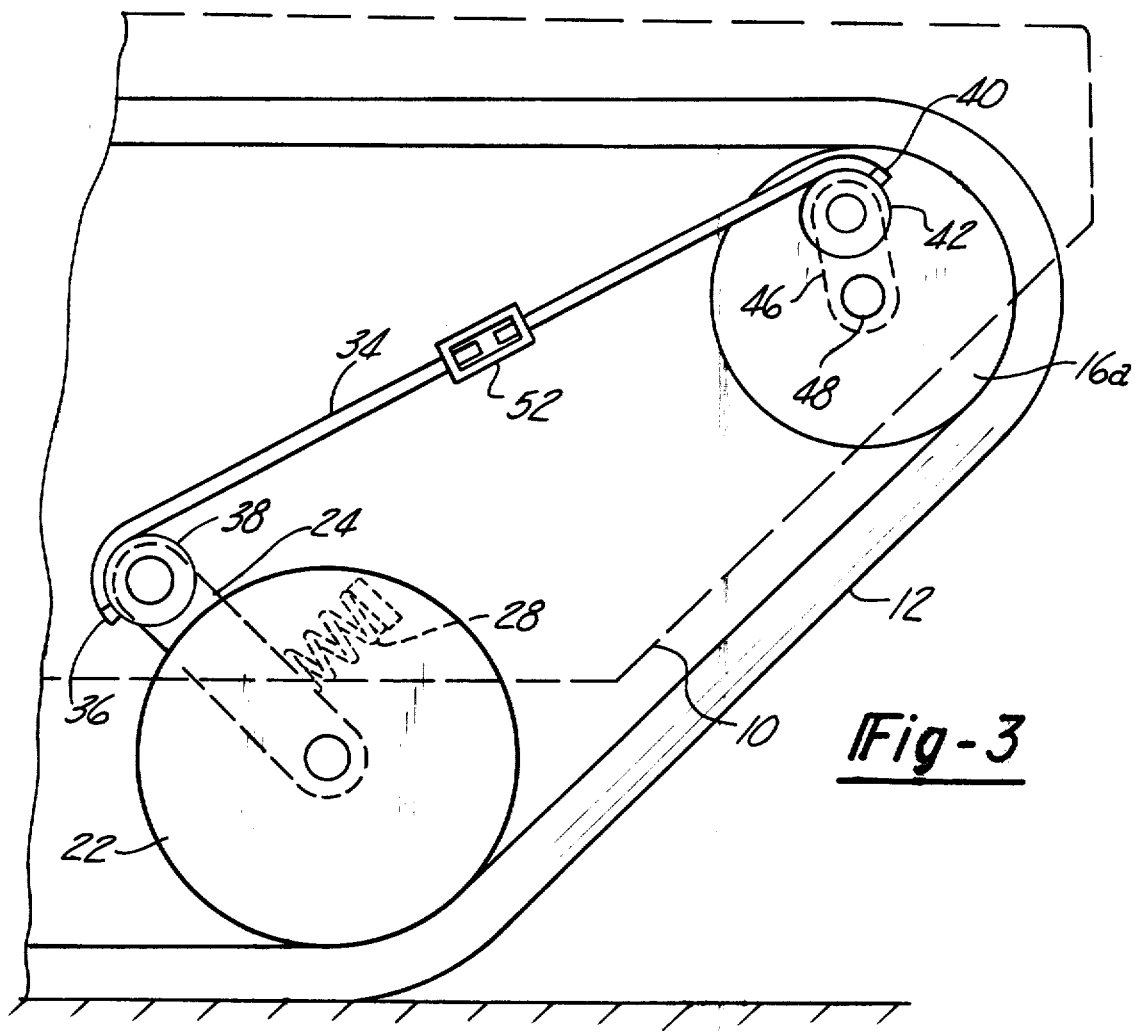
FIGS. 3 and 4 illustrate the present invention applied to idler wheels located at the rear ends of tracked vehicles.

FIG. 2 illustrates the invention applied to a vehicle wherein the drive sprockets 14 are at the rear of the vehicle, and the tension adjustment wheels 16 are at the front of the vehicle. FIG. 3 illustrates the invention applied to the reverse arrangement; i.e. the tension adjustment wheels are at the rear and the drive sprockets are at the front. Reference numerals used in FIG. 3 are similar to those used in FIG. 2. The operation of the FIG. 3 structure is generally similar to that of FIG. 2 in that upward movement of the road wheel tends to shift the tension-adjustment wheel 16a in the track tension-increasing direction, and vice versa.

The conventional use of levers as force-transmitters between the road wheel and the track tension adjustment wheel is relatively difficult when the tension adjustment wheel is located at the rear of the vehicle, as in FIG. 3. The difficulty is due to the fact that the road arm 24 and wheel suspension arm 46 are required to move in essentially the same direction (but through different arcuate distances); simple force-transmitting levers fulcrummed between the two arms cannot produce the desired movements of the two arms. Cable type force transmitters, as shown in FIG. 3, are able to produce the desired movements of arms 24 and 46.

Figure 4:
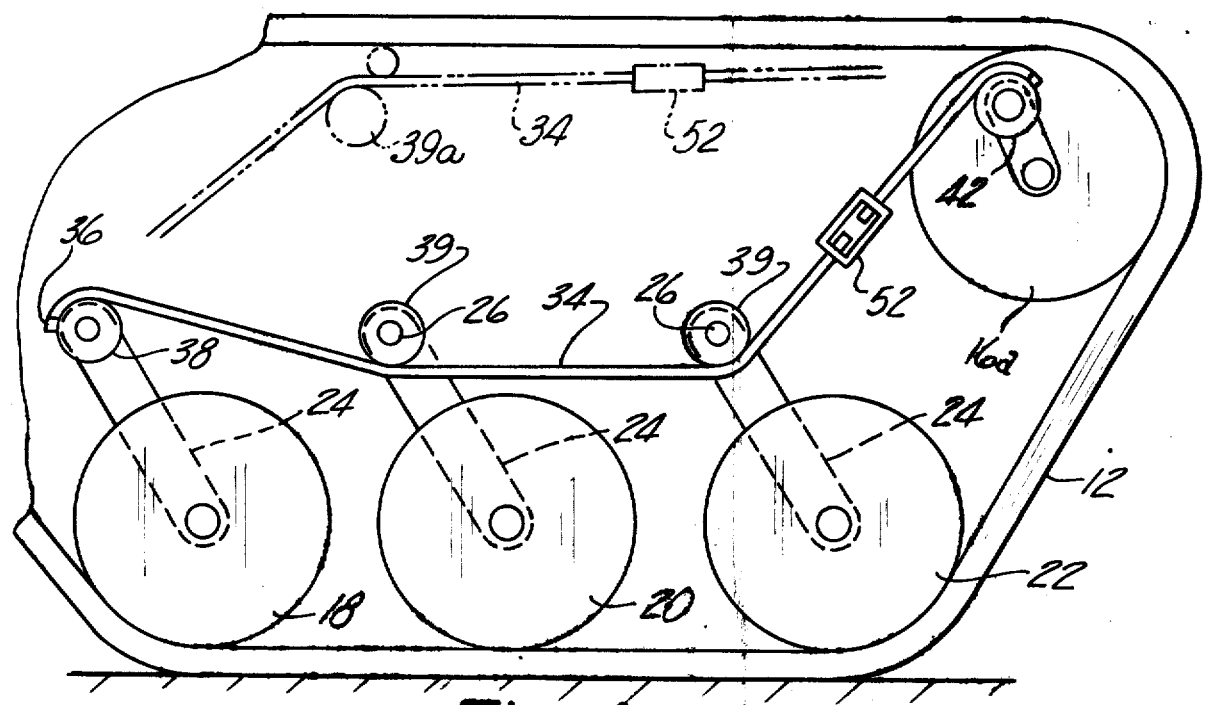

FIG. 4 illustrates an arrangement that is similar to that shown in FIG. 3, except that adjusting movement of the track tension wheel 16a is controlled by road wheel 18 located at the front of the vehicle. The force-transmitting cable 34 is shown trained under arcuate guide barrels or pulleys 39 mounted on axles 26 of the trailing road arms; the guide barrels may be fixed to the axles or free to rotate thereon.

Operation of the FIG. 4 structure is generally similar to the previously described operations. Upward movement of road wheel 18 (tending to produce slack in the forward portions of the track) causes cable 34 to wind onto barrel 38 and off of barrel 42, thereby shifting wheel 16a in the tension-increasing direction. A tension force is transmitted along the upper run of the track to maintain the track in operative engagement with the drive wheel located at the forward end of the vehicle.

As an alternative construction, cable 34 can be trained over a guide pulley 39a, as shown in phantom lines in FIG. 4. In any of the various cable arrangements the cable can be located either outside the hull or within the hull, depending on where space is available in the particular vehicle. The cable can be a single strand or multiple strand, depending on vehicle weight.

This invention is concerned principally with the use of cables or similar flexible tension elements (chains or belts) as the force-transmitting connection between the road wheel and the track tension adjustment wheel. Prior practice has been to employ cranks and levers as the force-transmitting connection. U.S. Pat. No. 2,427,162 shows in FIG. 3 thereof a force-transmitting connection between a road wheel 3 and a track-tension adjusting wheel 8, said force-transmitting connection comprising lever arms 11, 13, 14 and 15. The present cable arrangement is believed advantageous over the patentee's lever arm arrangements in that the cables require no extra pivot shafts or bearings. In large size vehicles, weighing for example 50 tons or more, the bearings for the extra levers would need to be relatively large, since the extra levers carry the track tension forces; ultimately these forces derive from the vehicle weight so that large size vehicles would require relatively large bearings for the patentee's levers. The presently proposed cables require no extra bearings; they do require the addition of barrels or drums 38 and 42, but such structures are relatively light and inexpensive.

The proposed cables carry the load in pure tension, which is believed to be advantageous. Levers as proposed in the above referenced patent take the load as a combination of forces, including bending forces, compression forces, twisting forces and shear forces. The levers and their attendant bearing points must be sized to carry the combination of forces.

It is believed that the use of levers as proposed in U.S. Pat. No. 2,427,162 would require a certain degree of precision that is unnecessary with the presently proposed cable arrangement. In applicant's arrangement the relative strokes of the road wheel and track-tension adjustment wheel are determined approximately by the relative lengths of lever arms 24 and 46. Precise control of the relative strokes of wheels 18 and 16 can be achieved by the manufactured diameters of barrels 38 and 42; these diameters are easily controlled at relatively low cost. In the above-noted patented arrangement the relative strokes of the road wheel and tension adjustment are determined by the relative locations of the pivots for the various levers. In actual manufacturing operations it is difficult to precisely and simultaneously control large numbers of pivot locations, especially if the pivots are to be located in different members that must be assembled together after the pivot openings have been machined.

Another advantage of the cable arrangement is its ability to be accommodated in small clearance spaces. Ordinarily the spaces circumscribed by the vehicle tracks are occupied to a great extent by large bearings, suspension arms, and shock-absorbing devices, thus leaving very little space for linkages of the type suggested in U.S. Pat. No. 2,427,162. Cables as herein proposed should be installable in close clearance spaces without undue difficulty.

We wish it to be understood that we do not desire to be limited to the exact details of construction shown and described, for obvious modifications will occur to a person skilled in the art.

we claim:

1. In a tracked vehicle comprising a hull, a series of road wheels located at spaced points along each side of the hull, laterally spaced drive wheels at one end of the hull, laterally spaced track-tension adjustment wheels at the other end of the hull, endless tracks trained around said wheels for hull propulsion, the road wheels and track-tension adjustment wheels being connected to the hull via individual suspension levers, whereby the road wheels are individually capable of up-and-down movements that tend to vary track tension: the improvement wherein flexible force-transmitting tension elements are trained between the suspension levers of the track-tension adjustment wheels and the suspension levers of selected road wheels; said flexible tension elements being directed so that upward movements of said selected road wheels move the adjustment wheels in directions to increase the track tension, and downward movements of said selected road wheels move the adjustment wheels in directions to decrease the track tension.

2. The vehicle of claim 1 wherein the track-tension adjustment wheels are located at the rear end of the hull, and the selected road wheels are located at the front end of the hull.

3. The vehicle of claim 2 wherein the flexible tension elements are routed over guide wheels located at approximately the same elevation as the track-tension adjustment wheels.

4. The vehicle of claim 1 wherein the various road wheel assemblies are alike, except that each of the selected road wheel assemblies includes an arcuate drum surface extending around the swing axis of the respective suspension lever, said drum surface being rigid with the associated lever and constituting an anchorage for an associated flexible element.

* * * * *